Aug. 10, 1954     R. R. RANEY ET AL     2,685,804
FRICTION DRIVE FLYWHEEL FOR HAY BALERS
Filed Nov. 24, 1950     3 Sheets-Sheet 1
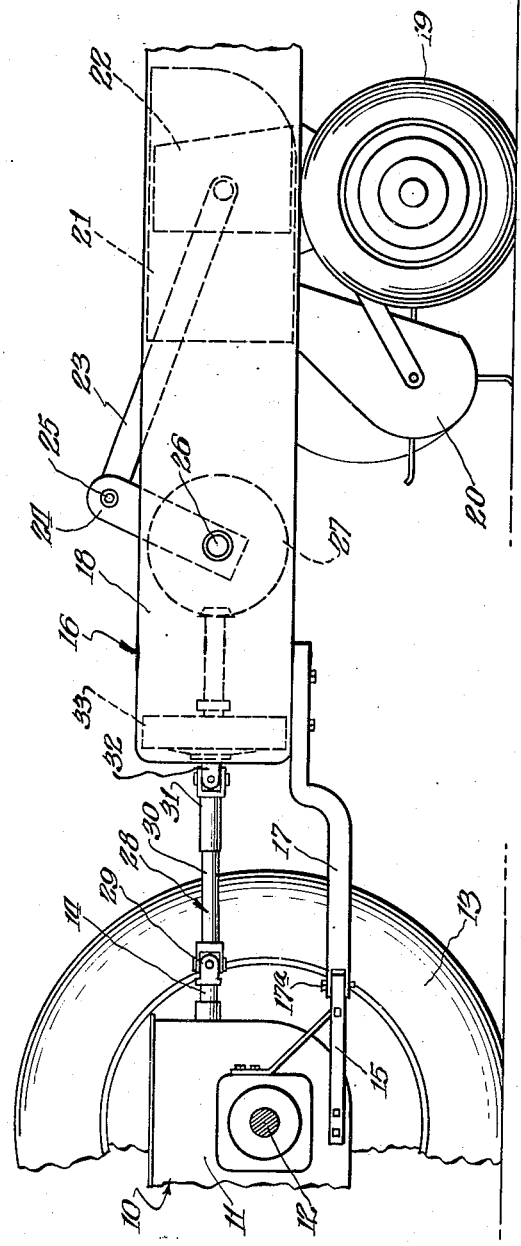
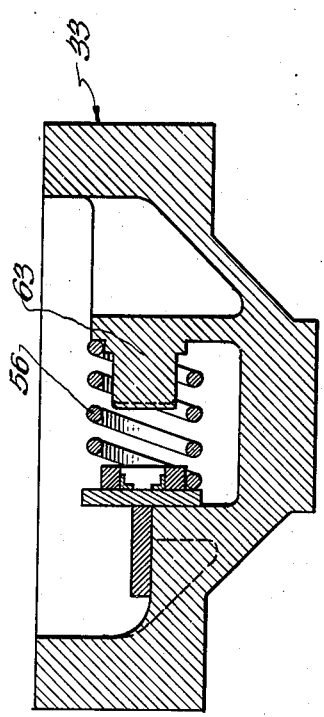
Inventors
Russell R. Raney
James H. Bornzin
Attorney

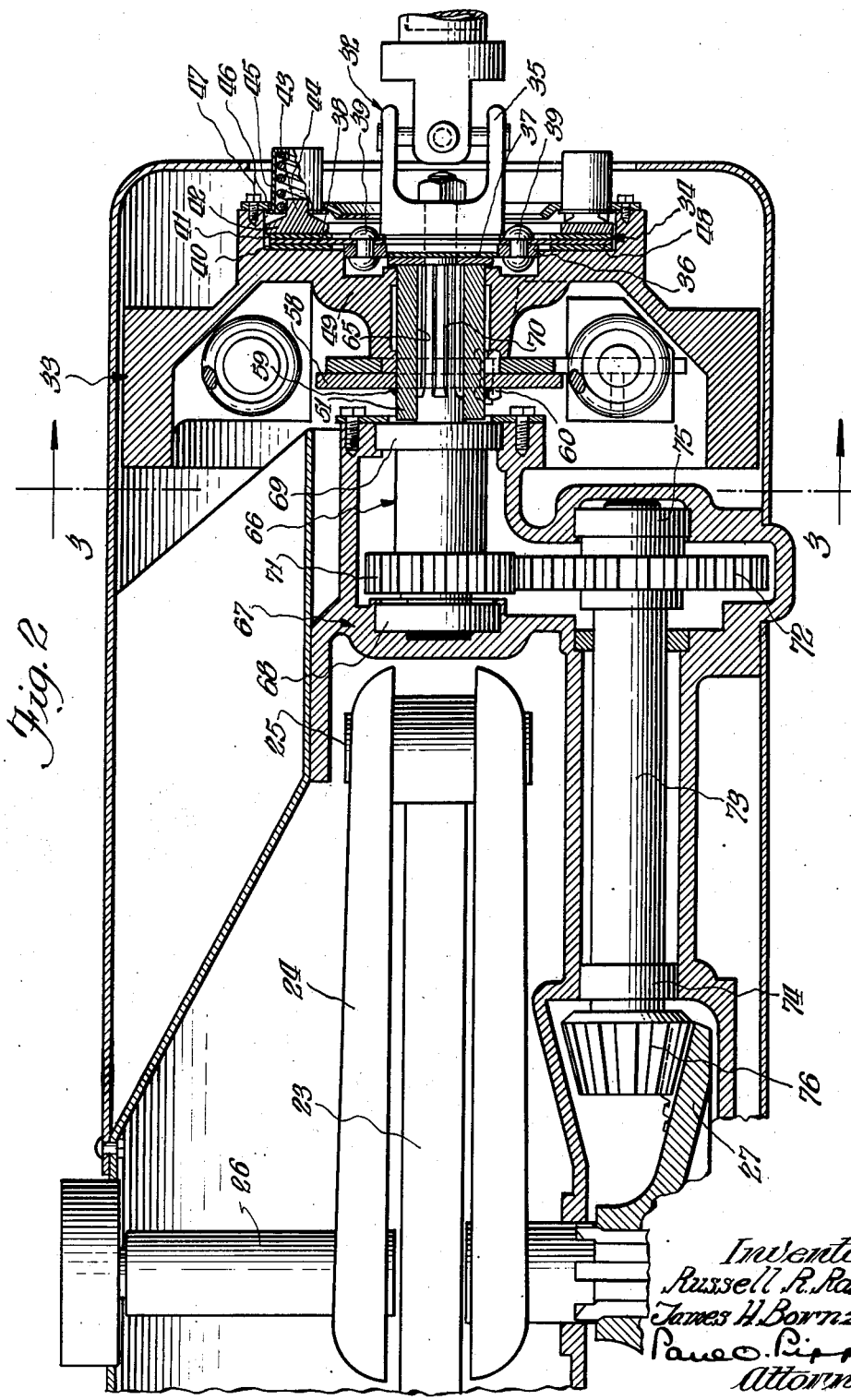

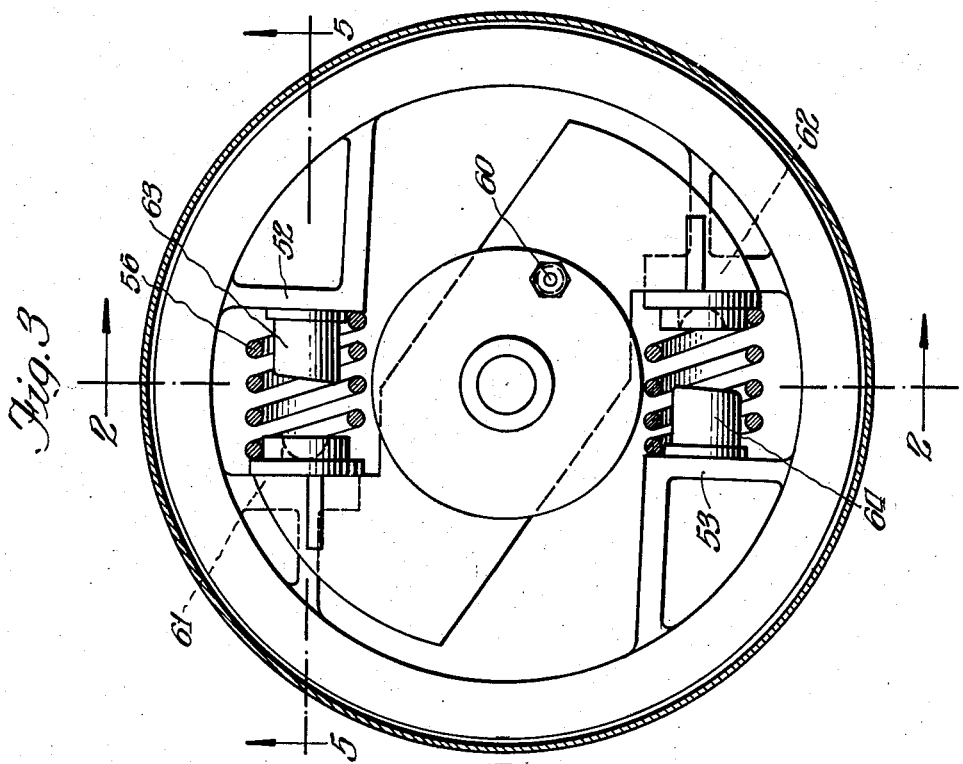
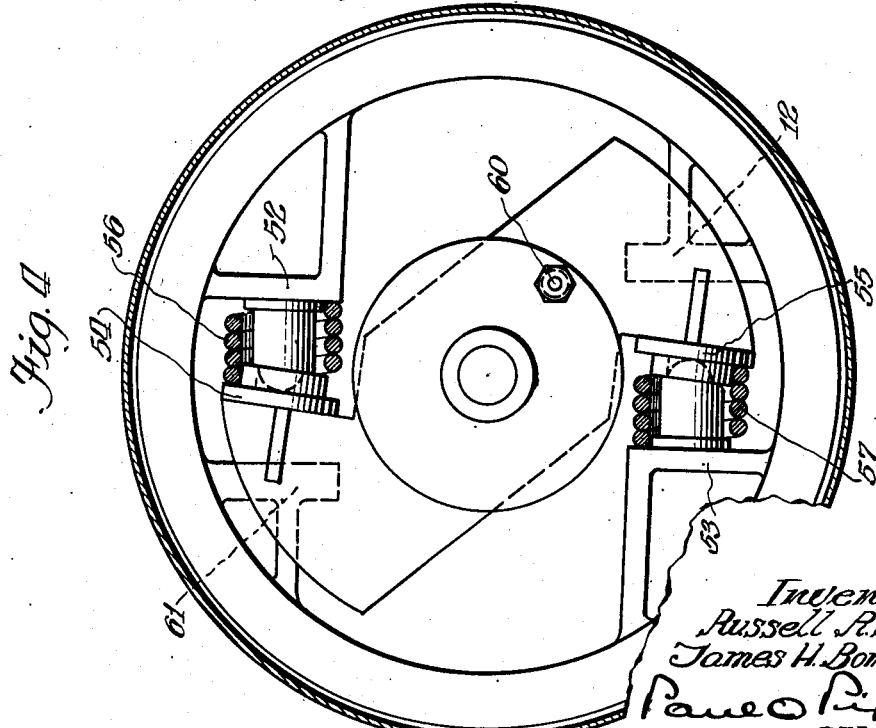

Patented Aug. 10, 1954

2,685,804

UNITED STATES PATENT OFFICE 2,685,804

FRICTION DRIVE FLYWHEEL FOR HAY BALERS

Russell R. Raney, Western Springs, Ill., and James H. Bornzin, Memphis, Tenn., assignors to International Harvester Company, a corporation of New Jersey Application November 24, 1950, Serial No. 197,396

5 Claims. (Cl. 74—572)

This invention relates to a new and improved friction drive fly-wheel for agricultural implements.

A principal object of this invention is to provide a yieldable clutch means associated with the fly-wheel inertia member of a baler or other large agricultural implement to permit the fly-wheel to receive variable speed or surging input drive without causing damage to the driving elements from the source of power to the fly-wheel.

An important object of this invention is the provision of a slip or friction clutch means in a fly-wheel for hay balers or the like capable of receiving various and sudden changes in speed, such as might be obtained through universal joints in which the driving shafts are angularly disposed, and delivering substantially constant output driving speed based upon the inertia of the fly-wheel.

Another and further important object of this invention is to provide a fly-wheel driven through a friction clutch and having a cushioning element disposed intermediate the output side of the fly-wheel and the member to be driven.

Still another object of this invention is to supply a hay baler of the type employing relatively large reciprocating inertia masses wherein there is considerable shock imparted to all the driving elements of the baler and having means associated with the fly-wheel of the baler to cushion and relieve the strain on the driving elements on both the input and output sides of the fly-wheel.

Another and still further important object of this invention is to provide a fly-wheel for driving a baling press wherein the fly-wheel includes a friction clutch on the input side thereof, a spring yielding means on the output side and including a shear pin located between the spring yielding means and the member to be driven.

Another and still further important object of this invention is to provide clutch slipping means between large inertia masses in which there may be and often is a variance between the speeds of such large inertia masses and wherein the slipping clutch compensates for such variances in either inertia mass saving the driving members from damage which would certainly be caused if the inertia masses were rigidly coupled.

Other and further important objects of this invention will become apparent from the disclosures in the following specification and accompanying drawings.

In the drawings:

Fig. 1 is a side elevational view of a tractor-drawn pick-up hay baler.

Fig. 2 is a longitudinal sectional view through the bale forming chamber shown in Fig. 1 and taken substantially on the line 2—2 of Fig. 3.

Fig. 3 is a transverse sectional view taken on the line 3—3 of Fig. 2.

Fig. 4 is a sectional view similar to that shown in Fig. 3 with the operating parts shifted relatively to one another.

Fig. 5 is a sectional view taken on the line 5—5 of Fig. 3.

As shown in the drawings:

The reference numeral 10 indicates generally an agricultural tractor adapted to pull a hay baler incorporating the principles of this invention. The tractor 10 includes a power plant body 11 and a transversely disposed axle 12 having large traction wheels 13 mounted on opposite ends thereof. The power plant on the tractor delivers rotation to a power take-off shaft 14 which is shown extending rearwardly from the tractor body 11 and used to impart rotational drive to trailing implements. The tractor engine is equipped with the usual fly-wheel (not shown) through which rotational drive is delivered to the power take-off shaft 14. A draw-bar 15 is mounted on the tractor body 11 at the rear thereof and is equipped to form the attaching means between the trailing implements and the tractor.

The trailing implements of this invention is a pickup hay baler designated by the numeral 16. The baler is provided with a hitch member 17 adapted to be attached to the tractor draw-bar 15 at 17a. The baler further includes a longitudinally extending bale forming chamber 18 having a wheel support 19 at substantially the rear thereof. A pick-up mechanism 20 is arranged at the side of the longitudinally extending chamber 18 and is adapted to pick up material to be baled from windrows and deliver it to the bale forming chamber 18 through an opening 21 in a vertical side thereof. A bale compressing plunger 22 is provided with a pitman 23 which is fastened to a crank arm 24 through a pivotal connection 25. The crank arm 24 is mounted on a crank shaft 26. A large bevel gear 27 is mounted on the crank shaft 26 and imparts drive thereto for effecting reciprocating motion of the bale compressing plunger 22.

A driving shaft 28 is joined to the power take-off shaft 14 of the tractor through a first universal joint 29 positioned in substantial vertical alignment with the hitch 17a for ready maneuverability of the vehicles. The driving shaft 28 includes telescoped portions 30 and 31 to compensate for variations in length of the shaft depending upon the angular relationship of the implement with the tractor. A second universal joint 32 in alignment with the first universal joint 29 is interposed between the driving shaft 28 and a fly-wheel inertia member 33.

The fly-wheel 33 is enclosed in the forward end of the bale forming chamber 18 and is driven by the universal joint 32 through a slip or friction clutch 34. This universal joint 32 includes a knuckle part 35 and a washer-like ring 36 which is welded at 37 to the knuckle 35.

The friction clutch includes a main disk 38 joined to the ring 36 by means of rivets or the like 39. Friction clutch faces 40 and 41 are provided on both sides of the clutch main disk 38. A clutch pressure plate 42 is adapted to lie against the friction clutch face 41. Projections 43 are provided on the back side of the pressure plate 42 and by means of helical coil springs 44 positioned over the projections 43 the pressure plate 42 exerts a pressure against the clutch face 41. The plurality of springs 44 are held in cups 45 positioned in a clutch housing plate 46 which is fastened by means of bolts or the like 47 to the fly-wheel 33.

The friction clutch face 40 is adapted to normally engage a circular wall 48 of the fly-wheel 33 so that drive from the power take-off shaft 14 of the tractor is delivered to the fly-wheel through the friction clutch 34. The hub portion 49 of the fly-wheel 33 is journaled for free rotation on a sleeve 50. A driving plate 51 is journaled over the hub 49. Ears or lugs 52 and 53 project inwardly from the fly-wheel 33. Lug members 54 and 55 are integral parts of the driving plate 51. Through the medium of springs 56 and 57 which are positioned between the ears 52 and 53 and the lug members 54 and 55 respectively, drive of the fly-wheel is imparted to the driving plate 51. A driven plate 58 is welded to the sleeve 50 at 59 and is provided with a shear pin 60 which extends through the driving plate 51 whereupon drive is delivered from the fly-wheel 33 down through the spring yieldable driving plate 51 and thence to the plate 58 through the medium of the shear pin. Inasmuch as the plate 58 is welded to the sleeve 50, fly-wheel drive is thus imparted to the sleeve 50.

As best shown in Figs. 3 and 4, stops 61 and 62 are provided in the fly-wheel 33 at positions spaced from the inwardly projecting ears or lugs 52 and 53 respectively. These stops 61 and 62 limit the spring extension of the driving plate 51 in order to positively maintain the springs 56 and 57 in operating position. Guide projection members 63 and 64 are mounted on the inwardly projecting ears 52 and 53 for the purpose of telescoping within the springs 56 and 57 respectively. The lengths of the projections 63 and 64 are substantially coextensive with the lengths of the springs 56 and 57 when the springs are fully compressed. The lugs 54 and 55 on the driving plate 51, after compressing the springs 56 and 57, then engage the projections 63 and 64 so that there is a direct and solid drive from the fly-wheel down to the sleeve 50. This construction eliminates the necessity of driving solely through fully compressed springs.

As best shown in Fig. 2 the sleeve 50 is provided with an internal spline 65. A shaft 66 is journaled in spaced bearings in a stationary supporting structure 67 within the elongated bale forming chamber 16 as shown at 68 and 69. One end of the shaft 66 has a reduced diameter and is externally splined as shown at 70 for slidable engagement within the internal spline 65 of the sleeve 50. Rotation of the fly-wheel 33 thus causes rotation of the shaft 66. A spur gear 71 is fastened to the shaft 66 and is in meshing engagement with a large gear 72 fastened on a shaft 73 which is journaled in the supporting structure 67 on spaced bearings 74 and 75. The end of the shaft 73 opposite the gear 72 carries a bevel gear 76 which engages the large bevel gear 27 mounted on the crank shaft 26.

In operation, the baler of this invention traverses a field of hay to be baled, picking up the hay from windrows by reason of the pick-up mechanism and delivering it to the longitudinally extending bale forming chamber 16, passing the hay through the vertical side opening 21, whereupon the plunger 22 through its reciprocating motion causes a compression of the hay whereafter it is tied by suitable means and discharged from the end of the bale chamber. Power for the reciprocation of the plunger 22 is obtained from the tractor engine fly-wheel through the power take-off shaft 14 of the pulling tractor. A fly-wheel 33 is disposed intermediate the power take-off shaft and the plunger drive gearing. Changes in speed of the power take-off shaft 14 such as might be caused by tractor engine impulses or a surging action of the rotative drive at it is delivered to the fly-wheel 33 through various angular inclinations of the universal joints 29 and 32 will thus be delivered to the implement fly-wheel. The fly-wheel by reason of the friction clutch has the ability to absorb power plant speed variations and further absorbs variations or torsional vibrations caused by the unconstant velocity of the center portion of a two knuckle drive shaft caused by compensation of unequal angular velocity when the knuckles are operating in an angular relationship. A rigid fly-wheel is not adaptable to such variations in rotative speed and the back load or shock imposes a maximum strain on the driving shaft 28 and its associated universal joints or knuckles 29 and 32 positioned between the power take-off shaft 14 and the fly-wheel 33, with the result that the knuckles wear out and break prematurely. Variations between speed of drive input to the fly-wheel 33 and speed of plunger movement are compensated for by the yieldable friction clutch 34. The large inertia mass of the fly-wheel 33 thus does not have its force directed back upon the universal joints 29 and 33 but rather, as the driving speeds vary or surge, the friction clutch 34 compensates for these variations and delivers only a substantially uniform speed to the fly-wheel. Similarly the friction drive fly-wheel acts as a full slipping clutch in the event an overloading of the machine occurs.

On the output side of the fly-wheel 33 drive is carried down through a yieldable driving means to the shaft 66 and through suitable gearing to the plunger crank shaft 26. The shear pin 60 joining the driving plate and the driven plate is designed to be capable of shearing in the event the bailing plunger 22 strikes some immovable or foreign object in the compression of the hay, thus saving the drive mechanisms from the plunger back to the fly-wheel against serious damage. It is contemplated that in lieu of the type of yielding driving means just described that a friction clutch such as 34 be applied to this side of the fly-wheel. The yieldable driving means on the side of the fly-wheel adjacent the plunger may take any desired form. It will thus be seen that the fly-wheel of this invention protects the baler and its driving parts both on the driven and driving sides thereof.

Numerous details of construction may be varied throughout a wide range without departing from the principles disclosed herein, and we therefore do not propose limiting the patent granted hereon otherwise than as necessitated by the appended claims.

What is claimed is:

1. A fly-wheel assembly for use in baling presses comprising an input drive shaft including at least one universal joint, an inertia fly-wheel member, and a yieldable slip clutch directly joining the universal joint and the input drive shaft with the inertia fly-wheel member whereby when the universal joint and the input drive shaft vary in speed the slip clutch cushions the load shock on the universal joint.

2. A fly-wheel assembly for use in baling presses comprising an input drive shaft including at least one universal joint, an inertia fly-wheel member, a yieldable friction clutch directly joining the universal joint and the input drive shaft with the inertia fly-wheel member, an output driven shaft, and limit spring yieldable means joining the inertia fly-wheel member and the output driven shaft.

3. A device as set forth in claim 2 in which the limit spring yieldable means includes a driving plate journaled over said output driven shaft and having substantially diametrically disposed ends, a stop member on said fly-wheel inertia member adjacent to and spaced from each of the ends of the driving plate, spring means interposed between the ends of the driving plate and their adjacent stop member, and driving means intermediate said driving plate and said output driven shaft.

4. A device as set forth in claim 3 in which the driving means includes a plate fastened to said output driven shaft and shear pin means joining said driving plate and said plate.

5. A fly-wheel assembly for use in bailing presses comprising an input drive shaft, a universal joint, an inertia fly-wheel member, and a yieldable slip clutch, and said assembly arranged in a geographical manner wherein the yieldable slip clutch is positioned intermediate the universal joint and the inertia fly-wheel member, and the universal joint is driven by the input drive shaft, whereby when the universal joint and the input drive shaft vary in speed the slip clutch cushions the load shock on the universal joint.

References Cited in the file of this patent

UNITED STATES PATENTS

| Number | Name | Date |
|---|---|---|
| 700,697 | Moore | May 20, 1902 |
| 737,477 | Radebaugh | Aug. 25, 1903 |
| 793,601 | Moore | June 27, 1905 |
| 1,683,954 | Carrey | Sept. 11, 1928 |
| 1,981,167 | Frost | Nov. 20, 1934 |
| 2,352,388 | Jones | June 27, 1944 |
| 2,497,641 | Vutz | Feb. 14, 1950 |
| 2,517,439 | Kaupke | Aug. 1, 1950 |